Patented Aug. 26, 1947

2,426,407

UNITED STATES PATENT OFFICE 2,426,407

LOW VISCOSITY CHANGE FLUID

John D. Morgan, South Orange, and Russell E. Lowe, East Orange, N. J., assignors to Cities Service Oil Company, New York, N. Y., a corporation of Pennsylvania No Drawing. Application September 6, 1945,
Serial No. 614,824

2 Claims. (Cl. 252—78)

This invention relates to liquids which have the property of remaining fluid over a wide range of temperature change, and which in addition show only a minimum of variation in viscosity as the temperature is raised or lowered from one value to another.

Occasion frequently arises for the use of a liquid which is fairly thin and highly mobile under ordinary conditions, and which has an absolutely constant viscosity at all temperatures between its freezing and boiling points. This ideal fluid has not as yet been found, but many liquids have been discovered or prepared which have low viscosity ratios approaching the ideal to a greater or lesser degree. These fluids are therefore well adapted to reduce the errors which creep into the making of orifice determinations, and to make possible the employment of orifice phenomena in fairly precise timing and control equipment.

We have discovered that a solution of about sixty parts by volume of bromobenzene, and about forty parts by volume of pseudo-cumene has properties more nearly approaching the ideal than anything which has been heretofore known. This liquid exhibits a very flat viscosity curve over a fairly wide range of temperatures. Specifically it shows a kinematic viscosity of 3.68 centistokes at —40° F. and of 1.20 centistokes at 100° F. Both of these values are somewhat less than the comparable values of any other fluids of which we are aware, and the flatness of the viscosity curve is fully indicated by the viscosity ratio of the liquid of 3.07. This latter value is also very much lower than that of known fluids, the best of which has a ratio of about 3.55.

It will further be noted that the pour point of our liquid is well below —40° F., while its boiling point is 315° F., and that the flat portion of the viscosity curve extends from —40° F., a condition of extreme cold, well above 100° F., and consequently well above normal atmospheric towards conditions of extreme heat. It follows, of course, that our composition may be used in the making of orifice measurements, and in control apparatus, the operation of which is based upon liquid flow, under substantially any condition of atmospheric temperature change.

A further important property of our composition is its very moderate vapor pressure of about 2.5 mm. mercury at 68° F. This property, together with its very high boiling point, means that our fluid remains in liquid state, and will suffer very little loss by evaporation at even the highest of normal atmospheric temperatures.

The proportions of ingredients employed in making our composition are highly critical, if the resulting product is to have the lowest attainable viscosity ratio and the other properties which have been identified above. Obviously, however, the characteristics of different lots of chemicals may vary slightly, depending upon the nature and extent of impurities which they contain, and some slight adjustment of the proportions of bromobenzene to pseudo cumene may be desirable in order to obtain a liquid having optimum properties.

Having described our invention, what we claim as new and useful is:

1. A fluid consisting essentially of a liquid solution of bromobenzene and pseudo cumene in such proportions as to have a viscosity at —40° F. of about 3.68 and at 100° F. of about 1.20.

2. A fluid consisting of a liquid solution of about sixty per cent of bromo benzene and about forty per cent of pseudo cumene, said percentages being by volume.

JOHN D. MORGAN.
RUSSELL E. LOWE.